Patented Dec. 15, 1931

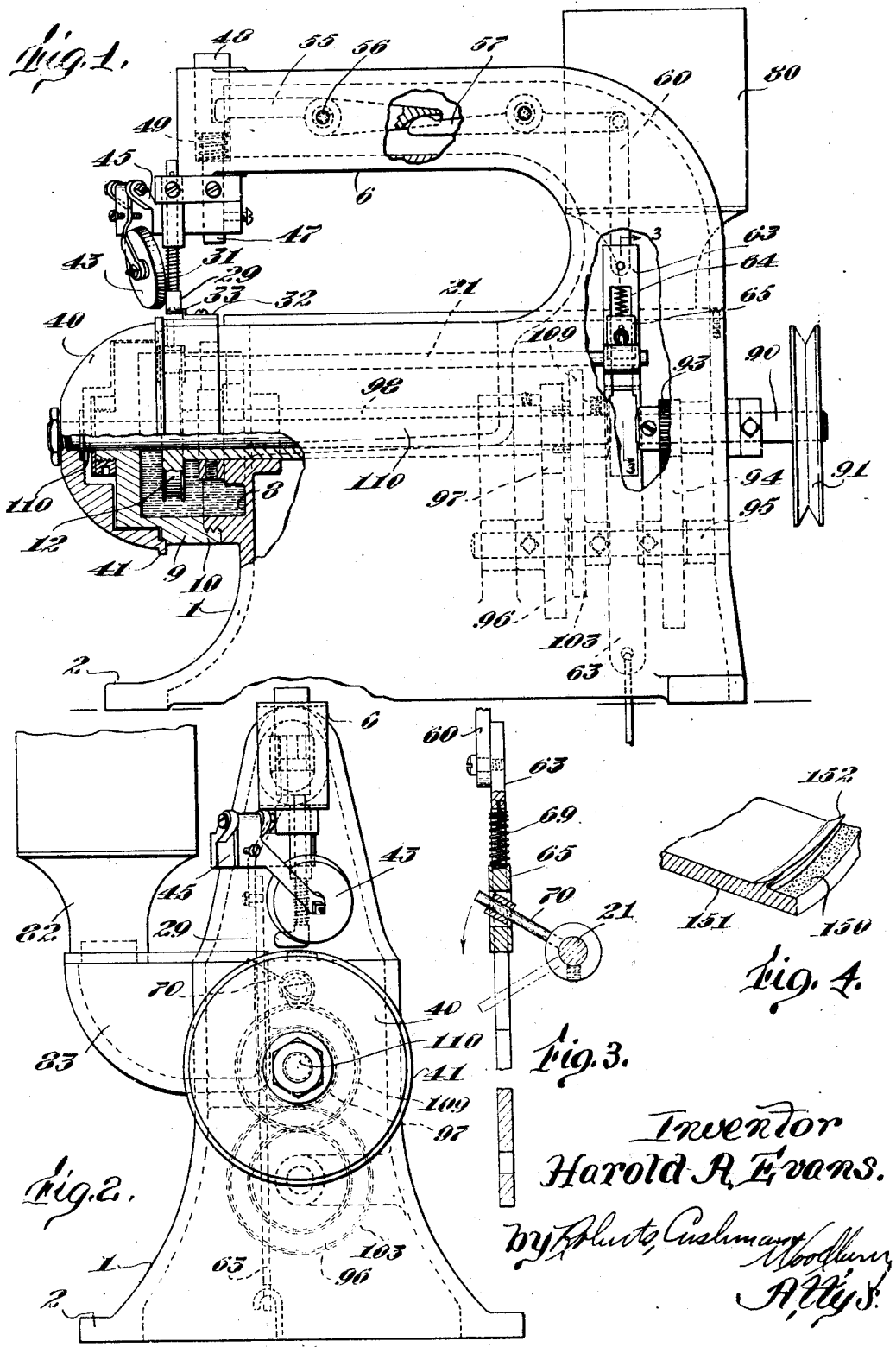

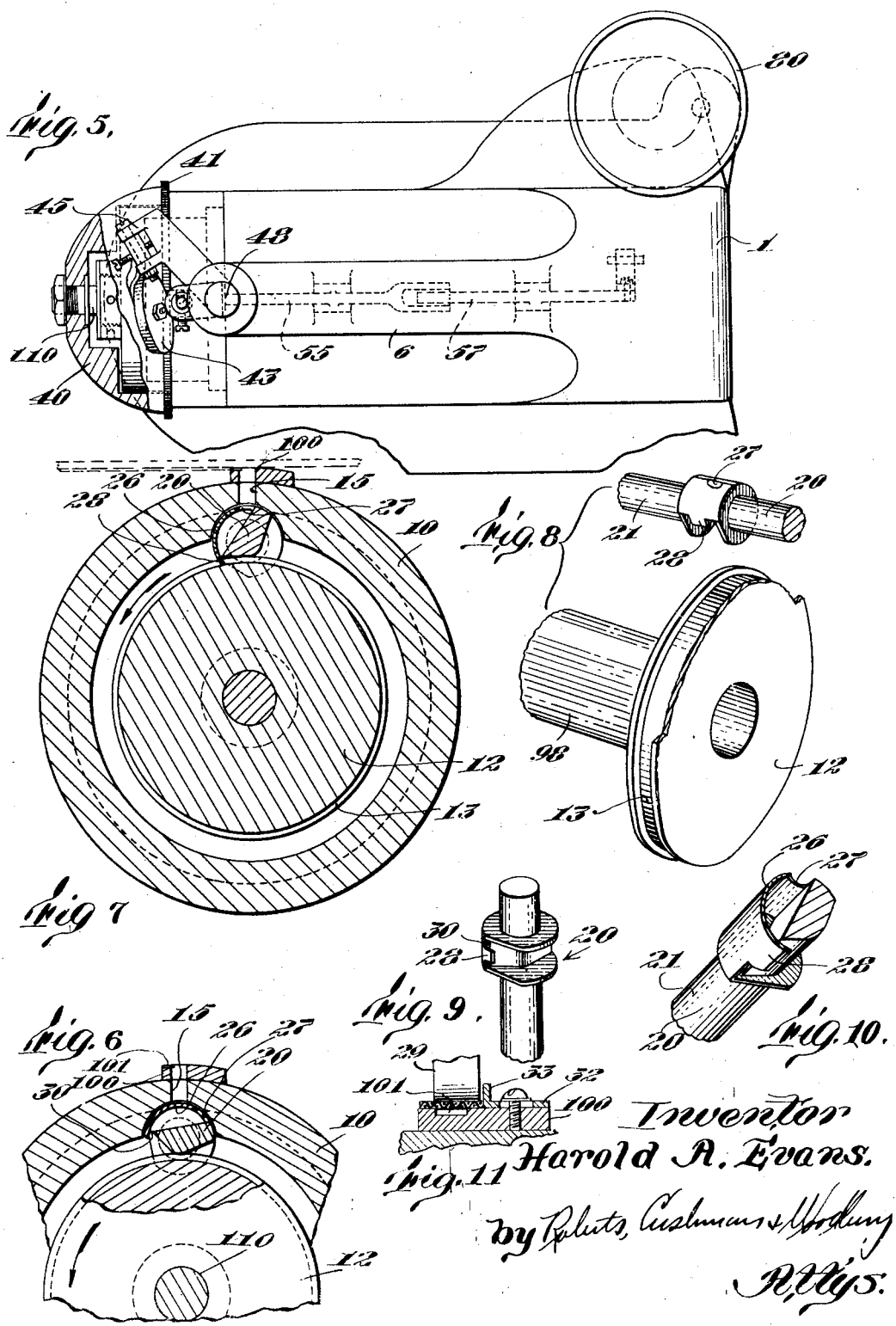

1,837,032

UNITED STATES PATENT OFFICE

HAROLD A. EVANS, OF LYNN, MASSACHUSETTS, ASSIGNOR, BY MESNE ASSIGNMENTS, TO GEORGE L. PREBLE, OF LYNN, MASSACHUSETTS, AND HORACE M. EATON, OF NAHANT, MASSACHUSETTS

CEMENTING MACHINE

Application filed August 29, 1929. Serial No. 389,195.

This invention relates to a machine for coating sheet material with a fluid or plastic substance such as a cement and more particularly is adapted to provide a strip of cement of definite width and controlled thickness to practically any desired portion of a sheet, said cementitious strip being either straight or irregular in its formation as desired.

Heretofore it has been customary to apply cementitious material to sheet articles such as the uppers of shoes, rubber garments and the like by hand implements such as brushes or by cementing machines which applied an amount of cement of indeterminate extent and thickness. Generally cement of this character was necessarily applied to both of the articles which were to be adhesively secured to each other. In any case, machines of this character as well as the manual methods employed resulted in the application of a much larger amount of cement than was necessary properly to secure the sheet articles together. Thus, for example in the manufacture of shoes, portions of the shoe uppers, insoles or the like were unnecessarily daubed with cement, thus causing undesirable damage to the articles and hindrance to further manufacturing operations as well as causing a very large waste in the amount of cementitious material or agglutinant employed. Furthermore machines of the character heretofore employed did not permit the ready application of the cementitious material to an irregularly defined edge of a sheet article or in an irregularly or sharply curved strip of any form.

The present invention affords a machine permitting the application of a strip of cement of determined width to practically any desired part of a sheet article, whether the margin of the same or an intermediate portion thereof, and enables the ready movement and rapid turning of the sheet articles so that the cement strip may follow any desired broken or irregular line. To this end the present invention provides a rotatable pump member, which in the preferred embodiment of the invention comprises a grooved rotor that is located within a casing containing cement. A suitable opening is provided through which the cementitious material is projected in a stream of uniform volume to the point of application to the sheet material. A suitable feed roll and cooperating roller are provided to move the sheet material past this opening at a constant speed. A yieldable shoe or the like may be provided opposite the opening firmly to hold the sheet material in engagement with the outlet thereof. Preferably a fixed scoop is arranged adjoining the groove to cooperate with the same in effecting the emission of a uniform stream of the cementitious material through the opening. This scoop member may conveniently be provided with a valve portion that is movable across the mouth of the opening to interrupt the flow of cementitious material, when it is desired to interrupt the operation of the machine, as for example when a new sheet of material is to be inserted in the same. Similarly the feed rollers may be moved away from each other to permit the ready removal or insertion of the sheet material, linkage being provided to close the valve concomitantaly with such a movement of the feed rollers. For example, such linkage may be controlled by a pedal which is depressed when the machine is in operation to cause the feeding of the sheet material and the emission of the cementitious material onto the same; as soon as the pedal is released the rollers move away from each other to release the sheet material and the valve is automatically closed.

In the accompanying drawings which exemplify one embodiment of the invention:

Fig. 1 is a front elevational view of the machine, parts being broken away and shown in section for clarity of illustration;

Fig. 2 is an end elevation of a portion of the machine;

Fig. 3 is a broken section on line 3—3 of Fig. 2 showing a portion of the control linkage;

Fig. 4 is a perspective detail of an insole with cement applied thereto in the manner permitted by the present machine;

Fig. 5 is a top view of the machine, parts thereof being broken away and shown in section;

Fig. 6 is a sectional detail of a portion of the cement feeding mechanism showing the valve member in the position which it occupies when the outlet passage is closed;

Fig. 7 is a vertical section through the cement feeding portion of the machine, the position of a sheet to which the cement is being applied and the cement strip which has been applied thereto being indicated by dotted lines;

Fig. 8 is a perspective view of the rotatable pump element and the combined scoop and valve member which is associated therewith, these parts being moved somewhat out of their normal relation to each other to permit clarity of illustration;

Figs. 9 and 10 are perspective details of the combined scoop and valve member;

Fig. 11 is a sectional detail of the part of the machine where the cement is applied to the sheet material.

Referring to the accompanying drawings which exemplify one embodiment of my invention, the numeral 1 designates the frame of the machine which may be provided with a base 2 for attachment to a suitable supporting stand or bench. This frame is preferably in the form of a hollow casting that provides supporting bosses or bearings for the operating shafts or rotatable elements of the machine and which also provides a passage for the cementitious material. This frame includes an overhanging portion 6 which is spaced above the body portion of the machine to provide room for the movement of a large area of sheet material between these parts of the frame if desired; this overhanging portion of the frame is also hollow in order to form a casing for a portion of the control linkage and related parts.

At one end of the machine is a substantially annular recess 8 which is adapted to cooperate with a removable casing member 9 in providing a cement containing receptacle 10. For example, the member 9 may be screwed into engagement with an outstanding flange upon the annular frame portion.

A rotatable pump element 12 is disposed within the cement containing receptacle 10 and is provided with a peripheral groove 13 being shown more in detail in Fig. 8. A fluid outlet 15 (Fig. 7) is disposed at the top of receptacle 10 in alignment with the peripheral groove 13 and a combined scoop and valve member 20 preferably extends into the casing between the grooved periphery of member 12 and outlet 15. This member is shown more in detail in Figs. 8, 9 and 10 and comprises a central shaft 21 which extends through the wall of receptacle 10 and is adapted to control the position of member 20. This shaft is cut away adjoining the grooved roller and a curved sheet metal part 26 is disposed around this broken away portion as shown particularly in Fig. 10. An opening 27 is provided in the sheet metal member adjoining one edge of the broken away part of the shaft 21 and the opposite edge of the sheet metal member is provided with a projection 28 that is adapted substantially to fit in the groove 13. The sheet metal member 26 is slightly spaced from the adjoining part of shaft 21 in the vicinity of this projection as designated by numeral 30, (Figs. 6 and 9) thus providing a narrow passage for the flow of fluid between the main portion of the valve member and the scoop portion 26.

When the member 12 is rotated at a suitable speed and the receptacle 10 surrounding the same at least contains cementitious material, there is a tendency for the cementitious material adjoining the groove to rotate therewith and thus be subjected to centrifugal force. The scoop 26, with its projection 28 engaging the groove 13, is effective in diverting the material from its rotary path and in causing the same to be emitted through opening 15; thus the scoop causes the force imparted to the liquid in the groove to project the latter from the receptacle 10. When the speed of the rotor is substantially constant and the pressure conditions within receptacle 10 do not vary, the projected stream will be practically uniform.

When the valve shaft 21 is rotated to remove the projection 28 from the groove, the opening 27 is moved out of its position in registration with the outlet 15 and the body portion of the shield or scoop 26 forms a closure for the outlet passage. In this position of the parts the member 26 no longer acts as a scoop to aid the movement of the cementitious material, and the centrifugal movement of this material outwardly is prevented by the position of member 26.

The overhanging head 6 of the frame adjustably supports a shoe 29 which may be disposed above the outlet 15, being yieldably urged toward the same by a spring 31. A block of metal 100 is disposed about the outlet of opening 15 beneath the shoe 29. Member 100 is provided with a groove 101 that extends from the mouth of opening 15 in the direction of the movement of the sheet material, and is shaped to determine the width and thickness of the applied cementitious strip. Obviously the block 100 may be detachably mounted upon the casing member 9 so that it may be readily replaced by a similar member with a groove of different dimensions, if desired. A suitable sheet metal element 32 with an upturned flange 33 may be secured to the frame adjoining the shoe 29 to provide an edge guide for sheet material, when desired, and may readily be removed.

In order to cause the movement of the sheet material past the outlet 15 at uniform speed, a suitable annular member 40 is disposed about a portion of the casing 9, being provided with a periphery 41 which may be knurled or corrugated as shown in Fig. 5 to form a feed roll for the sheet material. Preferably an idler roll 43 of a comparatively small diameter is disposed above the roller 40. This roll, as shown, may be disposed in a plane somewhat at an angle to the plane of rotation of the member 40 and may be adjustably mounted upon a bracket 45. This arrangement of the upper roller which is of small diameter permits the very ready turning of the sheet material to permit abrupt changes in the direction of application of the cementitious strip to the sheet. Preferably bracket 45 is secured to a vertically movable plunger 47 that is provided with a head 48 slidable in the extension 6 of frame 1. A spring 49 normally tends to move bracket 45 and hence the roller 43 upwardly so that in this position of the parts the roller 43 is spaced from the member 40 so that feeding of sheet material will not be affected.

A rocker 55 is pivotally mounted in the frame member 6 as designated by numeral 56 and engages a recess in the head 48 of plunger 47 as well as the end of a second rocker 57 which is similarly mounted. The other end of the latter is articulated to a substantially vertically disposed link 60 which is connected to a link 63 having a substantially vertical slot 64 therein. This portion of the link provides a guide for a slidable block 65 which is connected to the link by a coil spring 69 disposed within the slot. The block 65 is preferably provided with an opening engaging the end of a valve control arm 70 which extends radially from the valve shaft 21. Thus vertical movement of link 63 will tend to cause the block 65 to move therewith, the spring 69 cushioning this movement. Accordingly the valve member will be turned as a result of the movement of the link. This movement also results in swinging the rockers 57 and 55 to move plunger 48, bracket 45 and roller 43 downwardly, thus bringing the latter into close juxtaposition to the feed roller 40. Since the exact position of roller 43 may vary when materials of different thicknesses are engaged by the same and by the feed roll 40, the spring 69 is desirable to permit proper movement of the valve member under these varying conditions and to avoid undue strain upon the parts.

The cementitious material may be fed to the receptacle 10 in any suitable way; for example this material may be disposed in a tank 80 having a lower end 82 connected to a passage 83 formed in the frame 1 of the machine and communicating with the fluid receptacle 10. If desired, air pressure may be supplied to tank 80, thus forcing the cemetitious material under pressure to the receptacle 10 and aiding its flow through the outlet 15.

Any suitable drive arrangement may be provided for the rotating parts of the machine, it being noted that the rotor 12 is preferably driven at a higher speed than the feed roller or cone 40. One typical drive arrangement is illustrated in Figs. 1 and 2, a main drive shaft 90 being provided with a pulley 91 which may be connected to any suitable source of power. Shaft 90 extends into the hollow frame 1, where it supports a pinion 93 that engages a gear 94 upon a stub shaft 95. The latter carries another gear 96 that engages a gear 97 of a smaller diameter upon a sleeve 98 extending into the fluid receptacle and being joined to or integral with the rotor 12. A shaft 110 is disposed within the sleeve 98 and carries a comparatively large gear 109 meshing with a much smaller pinion 103 upon the auxiliary shaft 95 so that the shaft is driven at a speed that is considerably lower than that of the sleeve. Shaft 110 extends through the member 9 and is secured to the central portion of the feed roller or cone 40, thus being effective in driving the latter at a speed lower than that of rotor 12. Any suitable packing may be arranged adjoining the portions of sleeve 98 and shaft 110 that extend through the walls of the fluid receptacle.

In the operation of a machine of this character, the rotor 12 is driven at a fairly high speed and the feed roll 40 at a suitable lower speed, cementitious material being supplied to receptacle 10 from the tank 80. While a variety of suitable cementitious materials may be employed, the present machine is particularly advantageous in permitting the application of a heavy, viscous, or semi-fluid cement that may be non-drying or permanently plastic if desired.

When a sheet article is located between rolls 43 and 40 the link 63 is drawn downwardly by a suitable pedal (not shown) to bring the rollers into juxtaposition so that the sheet material is moved past the outlet 15. Simultaneously the block 65 and arm 70 are effective in swinging the combined scoop and valve member 20 so that the projection 28 engages the groove 13 of the rotor, thus providing a fixed scoop to aid the flow of fluid through the opening 27 to the outlet 15. Since the passage through which the fluid is forced is of a definite restricted cross-sectional size the volume of the fluid stream is substantially uniform and a cementitious strip of definite width will be applied to the sheet material. The groove 101 in the block 100 is particularly effective in permitting the attainment of this desirable result, since the pressure of the cementitious material flowing to groove 101 is ordinarily sufficient to fill that groove so that the latter determines the dimensions of the applied strip, it of course being evident that shoe 29 holds the fabric against the upper face of the block at each side of the groove. During this operation the shoe 29 is effective in holding the sheet material against the mouth of the outlet. When the sheet is to be removed the link 63 is released to move upwardly, the roller 43 being moved away from the feed roll 40 by spring 49 to permit removal of the sheet material, and the valve element 26 is simultaneously moved across the opening 15 and no longer acts as a scoop.

It is obvious that a machine of this character is adapted to provide a cementitious strip of definite width at practically any required location and to avoid unnecessary daubing of adjoining parts or waste of cement. For example one advantageous use of the machine is in the treatment of shoe insoles such as shown in Fig. 4, the cementitious strip 150 being restricted to the skived margin of the insole 151 and the lip 152 being free from cement that might interfere with the subsequent stitching operation.

I claim:

1. A machine of the class described comprising a receptacle for containing fluid, an outlet extending through a wall of the receptacle, a rotatable member disposed in the receptacle and having a grooved periphery, said grooved periphery being arranged to feed the fluid throughout the outlet due to the rotation of the member, and means to hold an article to be coated adjoining the outer end of the outlet, a valve member disposed between the grooved periphery of the rotatable member and the outlet, said valve member having a portion movable across the mouth of the outlet and another portion which is movable substantially into engagement with the grooved portion of the periphery when said first-named portion is moved away from the mouth of the outlet, said second-named portion comprising a scoop to direct the fluid from the groove to the outlet.

2. A machine of the class described comprising a receptacle for containing fluid, an outlet extending through a wall of the receptacle, a rotatable member disposed in the receptacle and having a grooved periphery, said grooved periphery being arranged to feed the fluid material throughout the outlet due to rotation of the member, and means to hold an article to be coated adjoining the outer end of the outlet, a scoop member disposed between the grooved periphery of the rotatable member and the outlet, said scoop member having a portion extending into the peripheral groove and a curved surface extending therefrom to the vicinity of the mouth of the outlet whereby fluid is directed from the groove to the outlet.

3. A machine of the class described comprising a fluid receptacle, a rotatable member having a grooved periphery disposed in the receptacle, a rotatable annular member disposed about the receptacle, an opening in the wall of the receptacle adjoining said annular member and substantially in alignment with the grooved periphery of the rotatable member, and means above the opening to hold an article over the same whereby fluid from the grooved periphery of the rotatable member may be fed through the opening upon the article due to rotation of the rotatable member, and a roller juxtaposed to the rotatable annular member to cooperate therewith in guiding the material past the opening.

4. A machine of the class described comprising a pump rotor, a casing about the same and an opening through the casing, a yieldably mounted shoe disposed adjoining the outlet of the opening and adapted to press a sheet of material against the same, a rotatable member disposed about the casing adjoining the opening, a guide roller juxtaposed to the annular member to cooperate therewith in moving the sheet past the opening.

5. A machine of the class described comprising a pump rotor, a casing about the same and an opening through the casing, a yieldably mounted shoe disposed adjoining the outlet of the opening and adapted to press a sheet of material against the same, a rotatable member disposed about the receptacle adjoining the opening, a guide roller juxtaposed to the annular member to cooperate therewith in moving the sheet past the opening, said roller being movable toward and away from the annular member, linkage operable thus to move the roller, a valve controlling the flow of fluid through the opening and linkage controlling the valve associated with the first-named linkage whereby the valve may be opened concomitantly with the movement of the roller toward the rotatable annular member.

6. A machine of the class described comprising a pump rotor, a casing about the same, an opening through the casing, a yieldably mounted shoe disposed adjoining the outlet of the opening and adapted to press a sheet of material against the same, a rotatable member disposed about the receptacle adjoining the opening, a guide roller juxtaposed to the annular member to cooperate therewith in moving the sheet past the opening, said roller being movable toward and away from the annular member, linkage operable thus to move the roller, a valve controlling the flow of fluid through the opening and linkage controlling the valve associated with the first-named linkage whereby the valve may be opened concomitantly with the movement of the roller toward the rotatable annular member, a yieldable connection between the first-named linkage and the linkage controlling the roller whereby variation in the position of the roller resulting from different thicknesses of sheet material does not affect the opening of the valve when the linkage is operated to move the roller into engagement with the sheet material.

7. A machine of the class described comprising a fluid containing receptacle, a rotor in the latter having a grooved periphery, said casing having an opening in alignment with the periphery, a swinging member disposed within the casing between said rotor and opening, said member having a curved part adapted to extend into said groove and providing an opening in alignment within the outlet, said member being movable to a position wherein it extends across the outlet to form a closure for the same and wherein it does not extend into the groove.

8. A machine of the class described comprising a receptacle, a rotor within the receptacle adapted to feed fluid through an opening in the same, means exterior of the opening for positioning sheet material over the end of the opening, a sleeve connected to the rotor for driving the same, and a shaft extending through the rotor, sleeve and receptacle, means for driving the shaft, and a rotatable feed member mounted upon the shaft and having a peripheral portion adjoining the opening.

9. A machine of the class described comprising pump means adapted to feed a stream of adhesive through an outlet, a member forming the outlet and providing a groove communicating therewith, means for moving sheet material past the outlet in the direction of the extent of the groove away from the same, said groove being arranged to determine the width and thickness of an adhesive strip applied to the sheet article, and means disposed adjoining the groove member to hold the sheet article against the same.

Signed by me at Boston, Massachusetts, this 22nd day of August, 1929.

HAROLD A. EVANS.